May 4, 1965  F. H. TOUT  3,181,865
FOOTBALL SIMULATING DEVICE
Filed Nov. 5, 1962  2 Sheets-Sheet 1

INVENTOR.
FRANCIS H. TOUT
BY
Christel & Bean
ATTORNEYS

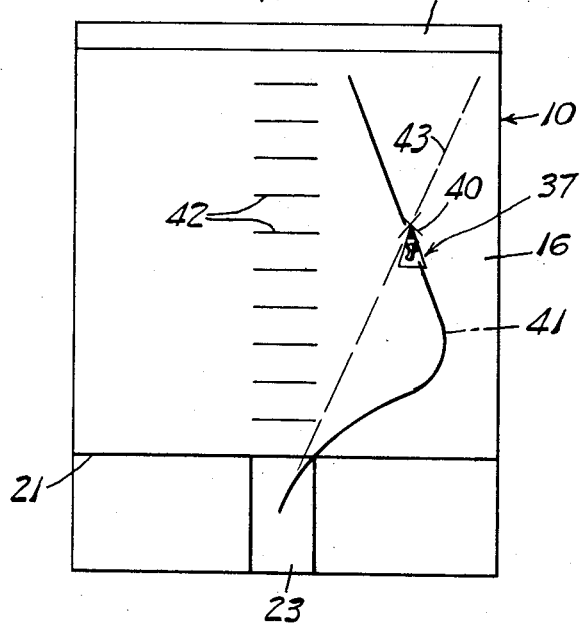
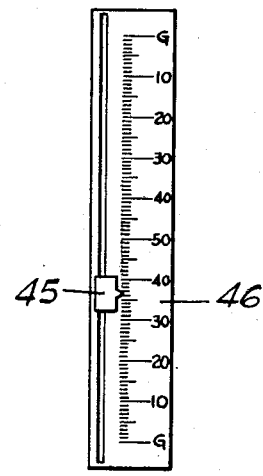
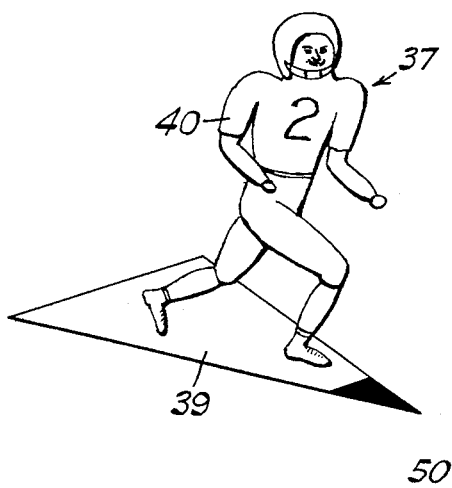
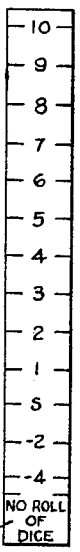
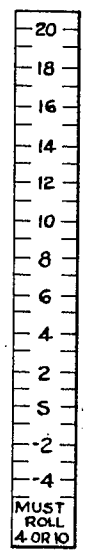
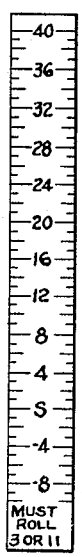

United States Patent Office 3,181,865
Patented May 4, 1965

3,181,865
FOOTBALL SIMULATING DEVICE
Francis H. Tout, 250 Emporium Ave., Buffalo, N.Y.
Filed Nov. 5, 1962, Ser. No. 235,208
5 Claims. (Cl. 273—94)

This invention relates to game apparatus and to a novel writing, drawing or inscribing device which may be employed therewith.

Reference will first be had to the novel writing, drawing or inscribing device which forms the basis of the novel game apparatus of the present invention. A fairly well known device for receiving temporary, easily eradicable written impressions, often used for memo purposes, for game scoring, for children's play and amusement, and the like, comprises a base surface having a wax-like coating and a transparent overlay usually comprising a thin tissue-like sheet and an overlying sheet of celluloid or other transparent sheet material of a more durable nature.

Making written impressions on the top celluloid sheet with a stylus, a pencil, or even with a finger nail, causes the tissue-like sheet to adhere to the wax-like surface, which is suitably colored, and produces a legible written impression. If the tissue-like sheet is then lifted from the base sheet the impression disappears. As stated above, this much of the writing or drawing device of the present invention is well known.

In the inscribing device of the present invention an added overlying sheet is provided which, like the aforesaid transparent celluloid sheet, is smooth and relatively tough. However, this added sheet is opaque and may be of colored plastic or opaquely colored cellulose material so that an impression inscribed on the underlying transparent celluloid sheet cannot be seen through the added overlying sheet.

The foregoing novel inscribing device may be used for a variety of game or play purposes and possibly for other purposes. For instance, one player may inscribe something on the device with the opaque top sheet raised, so that he can see what he inscribes. The device is then passed to a second player with the opaque top sheet covering the impression made by the first player and the second player may use a stylus, a pencil, or the like to inscribe something on the top sheet. This impression made by the second player will not show on the opaque top sheet but will make an impression on the underlying sheets which is visible when the top sheet is raised, whereupon the impressions made by both players will appear superposed.

Both impressions may of course be readily jointly eradicated by merely lifting the underlying transparent sheets from the wax-like impression surface. Various novel games or amusement procedures may be practiced employing this general apparatus, in addition to the game specifically illustrated and described herein. The specific game disclosed in this sepcification simulates a football game and the manner in which the same is played and the equipment employed therein in conjunction with the foregoing inscribing device will be described in detail in the following specification.

A specific embodiment of the inscribing device of the present invention and a complete embodiment of the football game apparatus and method of play are described in the following specification and illustrated in the accompanying drawings. However, it is to be understood that these specific embodiments are by way of illustration only and that various modifications and departures may be made without departing from the principles of the invention, the scope of which is limited only as defined in the appended claims.

In the drawing:

FIG. 2 is an elevational view thereof in closed position;

FIG. 3 is an elevational view of a scoring device used with the game of the present invention;

FIGS. 4 and 5 show opposite faces of a scale device which may be used with the game of the present invention;

FIGS. 6 and 7 show opposite sides of a further scale device; and

FIG. 8 is an enlarged view of a marker employed in the football game of the invention.

Figure 1:
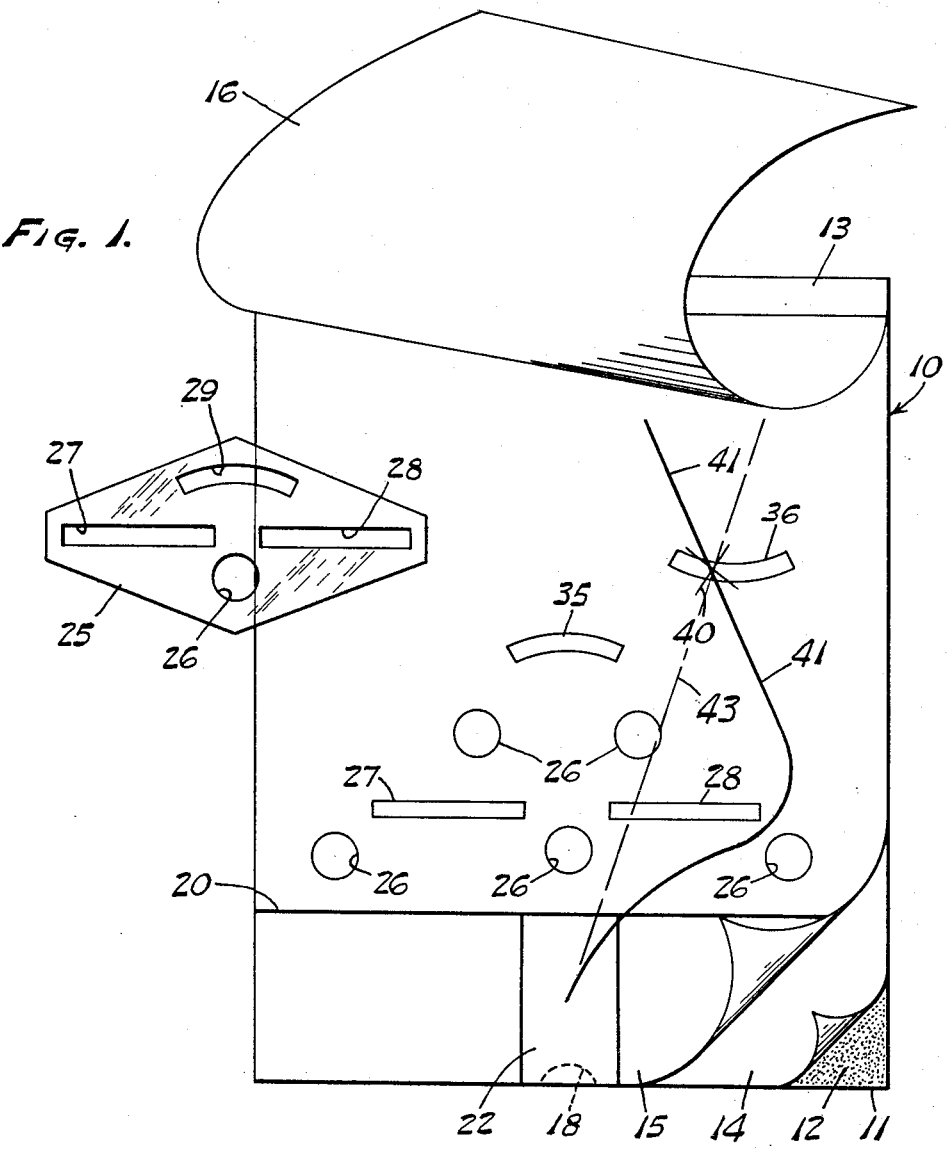
FIG. 1 is a general elevational view of one form of the inscribing device of the present invention with the top sheet laid back.

Like characters of reference denote like parts throughout the several figures of the drawing and the numeral 10 designates generally a pad device which, as best shown in FIG. 1, comprises a relatively stiff base sheet or panel 11 having a surface layer of colored wax-like impression material 12. In the form shown herein three superposed sheets are attached to the base member 11 in tablet form along the upper edge thereof, as indicated at 13 in FIG. 1. The several sheets may be stapled, cemented or otherwise attached.

The bottom sheet which directly overlies the impression surface 12 is designated 14 and comprises a thin transparent paper such as tracing paper or onion skin. The next sheet 15 is of transparent material of a tougher nature such as cellulose or clear plastic material and the top sheet, designated 16, is opaque and preferably also has a smooth, glossy surface. Sheet 16 may comprise a colored plastic material or colored cellulosic material.

This much of the structure of the present invention may be used for various game or play purposes as mentioned earlier herein wherein impressions inscribed upon the surface of sheet 15 with a pencil, a stylus or the like are visible at the surface of sheet 15 and wherein the opaque sheet 16 may be then overlaid, as shown in FIG. 2, and further impressions may be made which may relate in one way or another to the underlying impression, either through pure chance or even as a test of memory or prior observation. The impression made on the top sheet 16 with the stylus will not be readable thereon but may be read by lifting the top sheet and observing the surface of sheet 15 which will bear impressions made either thereon or on top sheet 16.

Base member 11 may have a tab cutout therein as at 18 to facilitate jointly lifting the sheets 14 and 15 or 14, 15 and 16 to obliterate impressions previously made.

Reference to the use of the inscribing device of FIGS. 1 and 2 in a specific football game which is likewise novel to the present invention will now be had. In this instance, both the sheets 15 and 16 have printed thereon scrimmage lines 20 and 21, respectively, and lines defining a starting box designated 22 and 23 on the sheets 15 and 16, respectively.

In FIG. 1 the numeral 25 designates a drawing template of celluloid or transparent plastic material having cutouts therein for drawing defensive football arrangements. In the present instance the circular cutout 26 designates an individual defensive player or tackler, the cutouts 27 and 28 indicate the two sides of a defensive line, and the cutout 29 may designate a pass blocker or interceptor.

A defensive player employing template 25 inscribes on sheet 15 a defensive position wherein he is allowed to employ a certain number of units, for instance in the illustrated instance the defensive player has inscribed five individual defensive players, the two halves of a defensive line, and a pair of arcuate arrangements 35 and 36 which according to one set of rules of the game may represent respectively a forward pass interceptor and a forward pass blocker. The defensive player may deploy these units in any manner that he desires on the playing surface of sheet 15.

He then lays the sheet 16 over the position he has thus inscribed and passes the pad to the other player of the game who is then the offensive player. The offensive player without knowing the defensive arrangement first is permitted to deploy blockers, in the present instance three in number. He does this by placing on the surface of sheet 16 three blockers, such as indicated generally at 37 in FIG. 2. As shown in FIG. 8, each blocker 37 may comprise a base portion 39 and a football figure 40 which serves as a convenient handling member.

Each of the three blockers are placed on the surface of sheet 16 by the offensive player at any desired locations and X's are drawn at the point portions of the bases 39 thereof, as shown at 40 in FIG. 2. If the point of intersection of an X comes within any of the defensive areas 26, 27, 28, 35 or 36 it cancels out that defensive area or position. Of course the offensive player does not know that until later.

The offensive player than starts his offensive play from the starting box 22 by moving a stylus in any desired direction toward the top end of the sheet, as for instance, either along the full line 41 of FIG. 2 for a running play or along the straight dash line 43 for a forward pass. Either of these lines will make no impression on the top sheet.

The players then raise the top sheet 16 and in the illustrated instance it will be noted that an offensive runner taking the course indicated by the line 41 would have successfully passed through the defensive positions without intersecting them with the exception of the position 36 but that position, representing a blocked forward pass, has no effect on a running play. Thus, in the illustrated instance the runner has gained the maximum of ten yards marked out by the graduations 42 of FIG. 2 and his position may be advanced ten yards on a scoring device shown in FIG. 3 by moving a sliding marker 45 on a scale 46 which represents the full football field. A second device substantially the same as the scoring device of FIG. 3 but graduated into ten yards instead of the full football field may be employed for recording the number of yards remaining for a first down.

If instead of the running play of the line 41, the offensive player had chosen a forward pass and marked the straight line 43, he would have passed over the line 28, and the tackler 26, which would not affect a forward pass, and the pass blocking position 36 would have been canceled by the defensive blocker, as indicated by the X marked 40 in FIG. 1. Therefore in this instance the offensive player would also make a maximum gain.

The foregoing permits a maximum gain of ten yards on each play and any gain or loss can be measured from the scrimmage line 21 by using the scale 50 shown in FIG. 4.

To enhance the variety of the game and permit gains of greater than ten yards, particularly because of forward pass plays, the scales 5, 6 and 7 and an ordinary pair of dice may be employed. A player may roll the dice at a cost of one down and if he rolls 2, 3, 4, 10, 11 or 12 on the dice the scale of the field is varied in accordance with the scales illustrated in FIGS. 5, 6 and 7 so that the potential gain or loss is multiplied as clearly shown in the graduations on these scales.

It is to be understood that the foregoing is a mere general indication of one mode of procedure in playing the football game of the present invention and that numerous modifications and variations in the rules and general procedure may be introduced without departing from the principles disclosed herein.

What I claim is:

1. A device for receiving temporary written impressions comprising a base sheet having a surface coating of a soft colored material having adhering characteristics, a thin transparent sheet overlying said base sheet and surface coating, a smooth transparent relatively more durable sheet overlying said thin transparent sheet to receive impressions from a stylus of the like rendered visible by adherence between the thin transparent sheet and the surface coating of the base sheet and readily eradicable by raising the said two overlying sheets from the base sheet, and a third overlying sheet of opaque material and having a smooth relatively glossy upper surface for likewise receiving stylus impressions visible only by raising said third overlying sheet and observing the immediately underlying smooth transparent sheet, said several overlying sheets having an aggregate thickness low enough to permit making a clear stylus impression therethrough.

2. A device for receiving temporary written impressions comprising a base sheet having a surface coating of a soft colored material having adhering characteristics, a thin transparent sheet overlying said base sheet and surface coating, a smooth transparent relatively more durable sheet overlying said thin transparent sheet to receive impressions from a stylus or the like rendered visible by adherence between the thin transparent sheet and the surface coating of the base sheet and readily eradicable by raising the said two overlying sheets from the base sheet, and a third overlying sheet of opaque material and having a smooth relatively glossy upper surface for likewise receiving stylus impressions visible only by raising said third overlying sheet and observing the immediately underlying smooth transparent sheet, said several overlying sheets being joined to said base sheet along a common marginal edge thereof and having a thickness and flexibility such as to permit making a clear stylus impression therethrough.

3. A device for receiving temporary written impressions comprising a base sheet having a wax-like surface coating, a thin transparent sheet overlying said base sheet and surface coating, a sheet of glossy transparent flexible material overlying said thin transparent sheet to receive impressions from a stylus or the like rendered visible by adherence between the thin transparent sheet and the wax-like surface of the base sheet, said impressions being readily eradicable by raising the said two overlying sheets from the base sheet, and a third overlying sheet of opaque material and having a smooth relatively glossy upper surface for likewise receiving stylus impressions visible only by raising said third overlying sheet and observing the immediately underlying sheet, said several overlying sheets having an aggregate thickness low enough to permit making a clear stylus impression therethrough.

4. A device for receiving temporary written impressions comprising a base sheet having a wax-like surface coating, a thin transparent sheet overlying said base sheet and surface coating, a sheet of glossy transparent flexible material overlying said thin transparent sheet to receive impressions from a stylus or the like rendered visible by adherence between the thin transparent sheet and the wax-like surface of the base sheet, said impressions being readily eradicable by raising the said two overlying sheets from the base sheet, and a third overlying sheet of opaque material and having a smooth relatively glossy upper surface for likewise receiving stylus impressions visible only by raising said third overlying sheet and observing the immediately underlying sheet, said several overlying sheets being joined to said base sheet along a common marginal edge thereof and having a thickness and flexibility such as to permit making a clear stylus impression therethrough.

5. A football simulating game comprising a tablet device having surface means adapted to receive an impression by inscribing directly thereon, an opaque overlay sheet and means for producing on said impression receiving surface means indicia inscribed on said opaque overlay sheet, whereby one player inscribes a defensive football position on the impression receiving surface means and a second player inscribes a course of attack on said opaque overlay sheet without reference to the inscribed defensive position, said course of attack being automatically superposed on the inscribed defensive position on the impression receiving surface means, said surface means and said overlay sheet having registering scrimmage lines thereon, a plurality of measuring devices of different scales for measuring distances from said scrimmage line, and chance means for determining the applicable measuring device in a given instance.

References Cited by the Examiner

UNITED STATES PATENTS

| | | | |
|---|---|---|---|
| 2,074,855 | 3/37 | Paasche | 35—66 |
| 2,879,609 | 3/59 | Watkins | 35—62 |
| 2,961,238 | 11/60 | Waldrop | 273—94 |
| 3,081,088 | 3/63 | Kast | 273—130 |

RICHARD C. PINKHAM, *Primary Examiner.*

DELBERT B. LOWE, *Examiner.*